United States Patent

Ishikawa et al.

[11] Patent Number: 5,728,025
[45] Date of Patent: Mar. 17, 1998

[54] DIFFERENTIAL APPARATUS

[75] Inventors: Yasuhiko Ishikawa; Sakuo Kurihara; Kazushige Nakane; Masao Teraoka; Takao Tashiro, all of Tochigi-ken, Japan

[73] Assignee: Tochigi Fuji Sangyo Kabushiki Kaisha, Japan

[21] Appl. No.: 627,351

[22] Filed: Apr. 5, 1996

[30] Foreign Application Priority Data

| Apr. 18, 1995 | [JP] | Japan | 7-092235 |
| Apr. 21, 1995 | [JP] | Japan | 7-096552 |
| Apr. 26, 1995 | [JP] | Japan | 7-102219 |

[51] Int. Cl.⁶ .................... F16H 1/42; B60K 17/20
[52] U.S. Cl. ............................................... 475/252
[58] Field of Search ......................... 475/252, 344

[56] References Cited

U.S. PATENT DOCUMENTS

| 1,389,580 | 9/1921 | Davis | 475/252 |
|---|---|---|---|
| 1,389,720 | 9/1921 | Ward | 74/464 |
| 2,269,734 | 1/1942 | Powell | 475/252 OR |
| 2,791,919 | 5/1957 | Wildhaber . | |
| 2,869,399 | 1/1959 | Miles . | |
| 3,021,731 | 2/1962 | Stoeckicht | 475/344 |
| 3,071,314 | 1/1963 | Flanagan . | |
| 3,251,244 | 5/1966 | Nickell . | |
| 3,412,632 | 11/1968 | McFiggans | 475/252 X |
| 3,768,336 | 10/1973 | Wharton | 475/252 OR |
| 4,776,234 | 10/1988 | Shea | 475/150 OR |
| 4,777,838 | 10/1988 | Aarestad | 74/462 X |
| 4,781,078 | 11/1988 | Blessing et al. . | |
| 4,838,118 | 6/1989 | Binkley | 475/150 X |
| 4,954,122 | 9/1990 | Nakao et al. . | |
| 5,019,021 | 5/1991 | Janson | 475/150 OR |
| 5,021,038 | 6/1991 | Beigang | 475/150 OR |
| 5,030,181 | 7/1991 | Keller | 475/150 OR |
| 5,078,660 | 1/1992 | Williams et al. | 475/252 OR |
| 5,083,987 | 1/1992 | Korner et al. | 475/252 X |

(List continued on next page.)

FOREIGN PATENT DOCUMENTS

| 130 806 | 1/1985 | European Pat. Off. . |
|---|---|---|
| 1105103 | 11/1955 | France . |
| 2126823 | 10/1972 | France . |
| 2553169 | 4/1985 | France . |
| 369548 | 2/1923 | Germany . |
| 1164187 | 2/1964 | Germany . |
| 2 305 305 | 8/1974 | Germany . |
| 28 48 206 | 5/1980 | Germany . |
| 39 31 745 | 3/1991 | Germany . |
| 40 13 196 | 10/1991 | Germany . |
| 40 27 368 | 3/1992 | Germany . |
| 4223374 | 7/1992 | Germany . |
| 195 38 016 | 4/1996 | Germany . |
| 196 09 666 | 9/1996 | Germany . |
| 51-144637 | 11/1976 | Japan . |
| 54-54765 | 4/1979 | Japan . |
| 54-69257 | 5/1979 | Japan . |
| 55-3058 | 1/1980 | Japan . |
| 55-64550 | 5/1980 | Japan . |
| 59-141254 | 9/1984 | Japan . |
| 60-81275 | 6/1985 | Japan . |
| 62-126645 | 8/1987 | Japan . |
| 62-200071 | 9/1987 | Japan . |
| 63-130961 | 6/1988 | Japan . |

(List continued on next page.)

*Primary Examiner*—Dirk Wright
*Attorney, Agent, or Firm*—Graham & James LLP

[57] ABSTRACT

A differential apparatus includes a differential casing, a pair of helical side gears and a pair of helical pinion gears. The helical pinion gears are accommodated in bores formed in the differential casing, respectively. The long and short helical pinion gears have respective first gear portions meshing with the side gears, respectively, and second gear portions meshing with each other. Each gear tooth of the long pinion gear is so tapered that tip thickness of the gear tooth is gradually decreased from an axial end of the gear portion toward the other gear portion. Even if the long pinion gear is inclined by meshing reactive forces, it is possible to ensure sufficient tooth bearing areas at respective tooth faces of the pinion gears.

15 Claims, 16 Drawing Sheets

U.S. PATENT DOCUMENTS

| | | | |
|---|---|---|---|
| 5,102,378 | 4/1992 | Gobert . | |
| 5,122,101 | 6/1992 | Tseng | 475/249 |
| 5,147,252 | 9/1992 | Mace et al. | 475/252 |
| 5,156,578 | 10/1992 | Hirota . | |
| 5,169,370 | 12/1992 | Dye et al. . | |
| 5,282,775 | 2/1994 | Teraoka . | |
| 5,295,923 | 3/1994 | Takefuta | 475/160 X |
| 5,310,389 | 5/1994 | Sato | 74/462 X |
| 5,326,333 | 7/1994 | Niizawa et al. . | |
| 5,346,443 | 9/1994 | Crysler et al. . | |
| 5,366,421 | 11/1994 | Hirota . | |
| 5,415,601 | 5/1995 | Cilano | 475/252 |
| 5,458,547 | 10/1995 | Teraoka et al. | 475/89 |
| 5,556,351 | 9/1996 | Hiraisha et al. | 475/150 OR |

FOREIGN PATENT DOCUMENTS

| | | |
|---|---|---|
| 2-38733 | 2/1990 | Japan . |
| 3-68634 | 7/1991 | Japan . |
| 4-64747 | 2/1992 | Japan . |
| 5-280596 | 10/1993 | Japan . |
| 6-58379 | 3/1994 | Japan . |
| 1442-772 | 1/1987 | U.S.S.R. . |
| 1421-933 | 3/1987 | U.S.S.R. . |
| 2010145 | 1/1991 | U.S.S.R. . |
| 1256990 | 11/1970 | United Kingdom . |
| WO 85/04936 | 11/1985 | WIPO . |
| WO 86/02420 | 4/1986 | WIPO . |

⇩ LOAD TORQUE

⇧ ROTATIONAL TORQUE

DIFFERENTIAL APPARATUS

BACKGROUND OF THE INVENTION

1. Field of the Invention

The present invention relates to a differential apparatus used for a vehicle or the like.

2. Description of the Related Art

In a prior art, a differential apparatus as shown in FIG. 1 is disclosed in Japanese Patent Publication (kokai) No. 5-280596. In the publication, the differential apparatus 201 includes a differential casing 203, a pair of helical side gears 205, 207 coaxially arranged on the output side of the differential apparatus 201 and respective pairs of long and short helical pinion gears 209, 211. The respective pinion gears 209 are accommodated in bores 213 formed in the differential casing 203 so as to frictionally rotate therein, while the respective pinion gears 211 are accommodated in other bores which are not shown in the figure. The pinion gears 209, 211 have respective first gear portions 215, 217 meshing with the side gears 205, 207, respectively and respective second gears portions 219, 211 meshing with each other. Each of the long helical pinion gear 209 is provided with an axle portion 223 of reduced diameter, which connects of the first gear portion 215 to the second gear portion 219. Driving force of an engine for rotating the differential casing 203 is transmitted from the pinion gears 209, 211 to vehicle wheels through the side gears 205, 207.

During transmitting torque, respective tips of the respective pinion gears 209, 211 are forced against wails of the bores by reactive force in meshing the side gears 205, 207 with each other, so that frictional resistance is produced between the pinion gears 209, 211 and the bores. In addition, due to thrust force of the meshing helical gears, frictional resistance is also produced between the side gear 205 and the side gear 207, between the respective pinion gears 209, 211 and the differential casing 203, and between the respective side gears 205, 207 and the differential casing 203. In this way, a "torque-responsive" type of differential limiting function of the differential apparatus can be realized by each frictional resistance.

In FIGS. 2, 3 and 4, an arrow indicated by reference numeral 225 designates a rotating direction of the differential casing 203 in case that the vehicle is traveling forward. Under such a forward traveling condition, each of the long pinion gear 209 is arranged so as to revolve preceding to the short pinion gear 211 in the rotating direction 225 of the differential casing 203.

When the differential casing 203 rotates in the direction 351 as shown in FIG. 2, rotational torque 227, 229 shown with arrows of dotted lines is exerted on the first gear portion 215 of the pinion gear 209 and the first gear portion 217 of the pinion gear 211 from the bores, respectively, while load torque 231, 233 as reactive force shown with arrows of full lines is exerted on the differential casing 203 through the bores, respectively.

Then, as shown in FIGS. 2 and 3, meshing reactive forces F1, F2 by the mutual meshing of the gears are produced in opposite directions at the second gear portions 221, 219 of the pinion gears 211, 209, respectively. On the other side, at the respective first gear portions 217, 215, meshing reactive forces F3, F4 in the same direction are produced by respective meshing operations of the pinion gears 211, 209 with the side gears 207, 205, as shown in FIG. 3.

From FIG. 4, it will be found that tipping torque is applied on the long pinion gear 209 since the directions of the forces F2, F4 applied on the pinion gear 305 are opposite to each other while the directions of the forces F1, F3 applied on the pinion gear 211 are substantially identical to each other. Since the long and short pinion gear 209, 211 are accommodated in the bores of the differential casing 203 so as to rotate therein and slight clearances are defined between the bores and the pinion gears 209, 211, each of the long pinion gears 305 is inclined to the rotational axis by the tipping torque, so that respective axial ends of the pinion gears 209 are shifted from one respective positions under unloaded condition (shown with full lines) to the other positions under loaded condition shown with double-dotted lines of FIG. 2.

Now, on condition that the drive torque is transmitted to the differential casing 203 so as to rotate it in the direction 225, the pinion gear 211 is called the pinion gear on the high reactive force side since the reactive forces in the same direction are applied on the pinion gear 211, while the pinion gear 209 is called the pinion gear on the low reactive force side since the reactive force in the opposite direction is applied from the second pinion gear portion 221 of the pinion gear 211 to the second gear portion 219 of the pinion gear 209.

Due to the inclination of the pinion gear 209, the first gear portion 215 comes into local contact with the side gear 205 while the second gear portion 219 comes into local contact with the short pinion gear 211, at respective local areas shown with arrows 235,237 of FIG. 5. Due to this local contact, as shown in FIG. 6, respective tooth bearing portions 239, 241 of the respective tooth surfaces are subject to a phenomenon "pitching" that the tooth surfaces are broken away to thin pieces. Consequently, the durability of the pinion gears 209, 211, the side gear 205 or the like will be influenced to lower the durability of the differential apparatus 201, finally.

On the contrary, when the vehicle is traveling backward (reverse driving) while the differential casing 203 rotates in the opposite direction to the direction 225, the pinion gears 209 are subject to driving torque at the first and second gear portions 219, 215 from the bores of the differential casing 203, on the high reactive force side. Thus, the revolving short pinion gears 211 prior to the pinion gears 209 are slanted, so that the pitching is caused by the local contact of the gears 209 to lower the durability of the differential apparatus 201.

SUMMARY OF THE INVENTION

It is therefore an object of the present invention to provide a differential apparatus constructed in a manner that respective tips of pinion gears are born by bores in a differential casing, which is capable of preventing the partial wearing caused by the inclined pinion gears thereby to improve the durability of the apparatus.

According to the present invention, the object described above can be accomplished by a differential apparatus for a vehicle, comprising:

a differential casing rotated by a driving force of an engine of the vehicle;

a pair of side gears arranged in the differential casing, opposing to each other and rotatably supported in coaxial with an axis of the differential casing;

at least one pair of pinion gears arranged radially outward the side gears, the pinion gears having respective first gear portions meshing with the side gears, respectively, and second gear portions meshing with each other;

at least one pair of bores formed about the side gears in the differential casing to accommodate the pinion gears so as to rotate frictionally therein; and preventing means for preventing an occurrence of local contact of the pinion gears with the companying meshing gears even if the pinion gears are slanted to axes of the bores.

Preferably, the preventing means comprises respective gear teeth of at least either one of the first gear portion and the second gear portion of at least either one of the pinion gears and each of the gear teeth is so tapered that tip thickness thereof is gradually decreased from an axial end thereof toward the other gear portion.

While transmitting the driving torque, respective tips of the pinion gears are forced against circumferential inner walls of the bores by their meshing reactive forces with the side gears, so that frictional resistance is produced between the gears and the bores. In this way, a "torque-responsive" type of differential limiting function of the differential apparatus can be realized by the above frictional resistance.

Then, even if meshing reactive forces at the first and second gear portions are applied to the pinion gears to incline them, it is possible to ensure sufficient tooth bearing areas at respective tooth faces of the pinion gears since each gear tooth of the gears is so tapered that tip thickness thereof is gradually decreased from an axial end thereof toward the other gear portion.

Consequently, it is possible to exclude an occurrence of the local bearing at the tooth faces of the pinion gears and an occurrence of the resulting pitching, so that the durability of the differential apparatus can be improved.

Alternatively, the above tapered configuration may be applicable to either one of the pair of pinion gears. In such a case, a process of gear-cutting of the pinion gears can be facilitated thereby to restrict a raising in manufacturing cost.

In the present invention, preferably, the pinion gears are constituted by helical pinion gears and each gear tooth of the pinion gear tapered as above is formed in a manner that an angle of tooth face on the left side of gear tooth with respect to the rotating direction of the pinion gear differs from an angle of the other tooth face on the right side of gear tooth.

In this case, since it is possible to make use of thrust forces due to meshing operation between the pinion gears and the side gears, the above differential limiting function of the differential apparatus can be further intensified.

More preferably, the first gear portion of the pinion gear tapered as above is separated from the second gear portion through an axle portion of reduced diameter and an inclination angle of tooth face on one side of each gear tooth of the first gear portion is equal to that of tooth face on the other side of each gear tooth of the second gear portion while the inclination angle of tooth face on the other side of each gear tooth of the first gear portion is equal to that of tooth face on one side of each gear tooth of the second gear portion.

With the above arrangement, even if the above tapered configuration is applied to the only one of the pinion gears, it is possible to ensure sufficient tooth bearing areas at respective tooth faces of the pinion gears irrespective of the rotating direction of the differential casing. Consequently, it is possible to exclude an occurrence of the local bearing at the tooth faces of the pinion gears and an occurrence of the resulting pitching, so that the durability of the differential apparatus can be improved.

In the present invention, each of the gear teeth of the pinion gear tapered as above may be formed so as to have a profile of a straight line. Alternatively, each gear tooth of the tapered pinion gear may be formed so as to have a profile of a continuously curved line.

Preferably, such a tapered pinion gear is arranged preceding the other pinion gear with respect to the rotating direction of the differential casing while the vehicle is traveling forward. In this case, it is possible to realize a further improvement in durability of the differential apparatus.

Preferably, the preventing means comprises respective gear teeth of at least either one of the first gear portion and the second gear portion of at least either one of the pinion gears and each of the gear teeth is shaped so that a tip thereof is curved convexly from an axial end thereof toward the other gear portion.

With the arrangement mentioned above, even if meshing reactive forces at the first and second gear portions are applied to the pinion gears to incline them, it is possible to ensure sufficient tooth bearing areas at respective tooth faces of the pinion gears since each of the gear teeth is shaped so that a tip thereof is curved convexly from an axial end thereof toward the other gear portion.

Consequently, it is possible to exclude an occurrence of the local bearing at the tooth faces of the pinion gears and an occurrence of the resulting pitching, so that the durability of the differential apparatus can be improved.

Alternatively, the above tapered configuration may be applicable to either one of the pair of pinion gears. In such a case, a process of gear-cutting of the pinion gears can be facilitated thereby to restrict a raising in manufacturing cost.

More preferably, the pinion gear curved as above is one of the pinion gears, which is arranged preceding the other pinion gear with respect to a rotating direction of the differential casing while the vehicle is traveling forward.

More preferably, the pinion gears are constituted by helical pinion gears and each gear tooth of the pinion gear curved as above is formed in a manner that a curvature of tooth face on the left side of gear tooth with respect to the rotating direction of the pinion gear differs from a curvature of the other tooth face on the right side of gear tooth with respect to the rotating direction of the pinion gear. In this case, it is possible to increase the tip thickness of the pinion gear, whereby the durability of the differential apparatus can be improved.

Preferably, the first gear portion of the pinion gear curved as above is separated from the second gear portion through an axle portion of reduced diameter and a curvature of tooth face on one side of each gear tooth of the first gear portion is equal to that of tooth face on the other side of each gear tooth of the second gear portion while the curvature of tooth face on the other side of each gear tooth of the first gear portion is equal to that of tooth face on one side of each gear tooth of the second gear portion. With the above arrangement, even if the above curved configuration is applied to the only one of the pinion gears, it is possible to ensure sufficient tooth bearing areas at respective tooth faces of the pinion gears irrespective of the rotating direction of the differential casing. Consequently, it is possible to exclude an occurrence of the local bearing at the tooth faces of the pinion gears and an occurrence of the resulting pitching, so that the durability of the differential apparatus can be improved.

It is preferable that a convexly curved portion of each gear tooth of at least either one of the first gear portion and the second gear portion is arranged on the only side of the gear teeth facing the other gear portion.

Preferably, on condition that at least one of the pinion gears is inclined by a predetermined angle by meshing reactive forces exerted on the first and second gear portions while transmitting torque, the preventing means comprises gear teeth of at least one of the pinion gears, an angle of each tooth trace of the gear teeth being corrected by the predetermined angle, to a direction opposite to an inclining direction of the inclined pinion gear.

In this case, owing to the previous correction in tooth trace to cancel the inclination of the pinion gear which would be caused at the time of transmitting torque, the meshing of respective pinion gears would be normalized on condition that the pinion gear is slanted. In this way, it is possible to prevent an occurrence of deviated bearing (also called "one-sided contact") and pitching in all meshing areas of the respective gears, whereby the durability can be improved. In addition, different from the conventional differential apparatus, the manufacturing cost can be saved all the more because there is no need to increase the strength of the respective gears in order to prevent the occurrence of pitching.

In the present invention, preferably, the pinion gear corrected as above is arranged preceding the other pinion gear with respect to a rotating direction of the differential casing.

As mentioned above, with the application of correction in tooth trace to the only pinion gear which is arranged preceding the other pinion gear with respect to a rotating direction of the differential casing and inclined by the meshing reactive forces at the time of transmitting torque, it is possible to exclude both deviated bearing of the respective pinion gears and pitching derived therefrom at low cost without increasing the strength of the respective gears specially.

In this case, since the concerned pinion gear to which the above correction is to be applied is the same which is subject to a large driving torque, it is possible to prevent both deviated bearing of the gears and pitching substantially, whereby the durability can be improved sufficiently.

Preferably, the predetermined angle is determined by a distance between bearing points of the corrected pinion gear born by one of the bores and a radial distance between the corrected pinion gear and the bore.

That is, the inclination angle of the pinion gear is determined by the radial distance between the pinion gear and the bore while the larger the distance between the bearing points of the pinion gears gets, the larger the torque becomes. A position where the pitching is caused when the gear is inclined changes dependent of both of the distance between the bearing points and the radial distance. Thus, by determining the correction angle of tooth trace on the basis of the above factors, it is possible to prevent both deviated bearing of the gears and pitching effectively, whereby the cost can be reduced.

More preferably, at least one of the pinion gears includes an intermediate axle portion between the first and second gear portions and either one of the first and second gear portions on both sides of the intermediate axle portion includes the gear teeth corrected by the predetermined angle.

In this case, if only correcting an angle of tooth trace (i.e., lead angle) of the gear teeth, which are subject to severe deviated bearing by the meshing reactive force of the gears, it is possible to prevent the occurrence of pitching and deviated bearing effectively. In addition, even if the pinion gear is slanted, it is possible to ensure a wide frictional area between the pinion gear and the bore.

These and other objects and features of the present invention will become more fully apparent from the following description and appended claims taken in conjunction with the accompanying drawings.

DESCRIPTION OF THE PREFERRED EMBODIMENT

A first embodiment in accordance with the present invention is now described with reference to FIGS. 7, 8 and 9.

Figure 7:
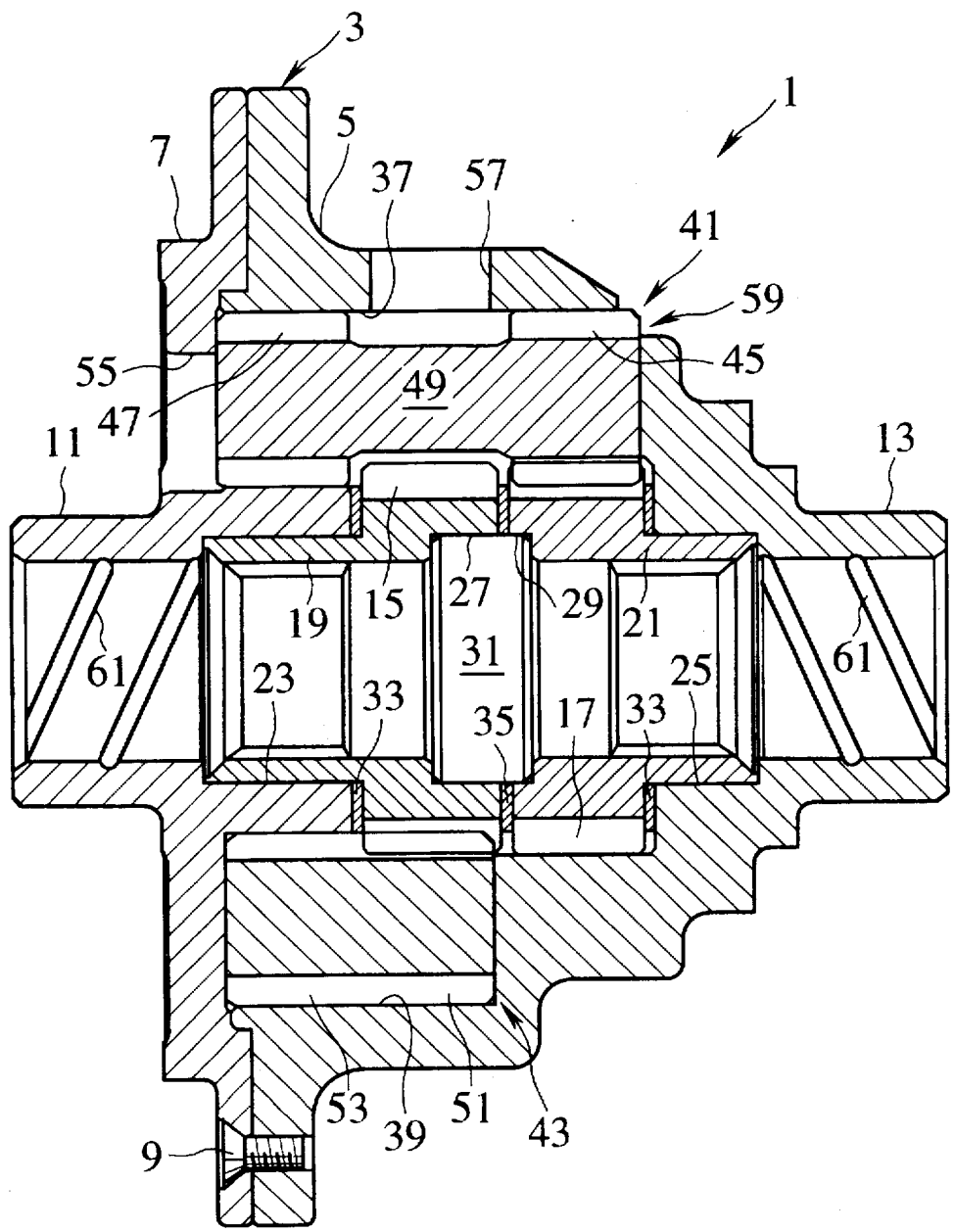
FIG. 7 is a longitudinal sectional view of a differential apparatus in accordance with a first embodiment of the present invention.

FIG. 7 shows a differential apparatus 1 in accordance with the first embodiment of the present invention. It is noted that, in FIG. 7, left and right directions shown in the figure correspond to left and right directions of FIGS. 8 and 9, respectively.

As shown in FIG. 7, a differential casing 3 of the differential apparatus 1 is composed of a casing body 5 and a cover 7 connected to each other through bolts 9. The differential apparatus 1 is arranged inside a not-shown differential carrier while left and right boss parts 11, 13 of the differential casing 3 are supported by the differential carrier through bearings. The differential carrier is provided with an oil reservoir not-shown in the figure. In arrangement, the stationary differential apparatus 1 includes a lower portion immersed in the oil reservoir. With a rotation of the differential apparatus 1, oil is splashed from the oil reservoir.

A pair of left and right helical side gears 15, 17 are accommodated in the differential casing 3. The helical side gears 15, 17 includes hollow boss parts 19, 21 which are rotatably supported by bearing parts 23, 25 of the differential casing 3. Enlarged diametrical parts 27, 29 are formed inside the boss parts 23, 25, respectively. Arranged radially inward of the enlarged diametrical parts 23, 25 is a thrust block 31 which supports respective free ends of the helical side gears 15, 17 for centering them.

Not-shown left and right rear axles, which penetrate through the boss parts 11, 13 of the differential casing 3, are spline-coupled to the side parts 19, 21 of the helical side gears 15, 17 respectively. Thrust washers 33, 33 are arranged between the respective helical side gears 15, 17 and the differential casing 3 while a thrust washer 35 is interposed between the helical side gears 15 and 17.

Along outer peripheries of the helical side gears 15, 17, the casing body 5 has plural pairs of long and short bores 37, 39 formed so as to extend in parallel with a rotational axis of the drive shafts. In the casing body 5, long helical pinion gears 41 are accommodated to frictionally rotate in the long bores 37, while short helical pinion gears 43 are accommodated so as to frictionally rotate in the short bores 39, respectively.

Each of the long helical pinion gears 41 consists of a first gear portion 45, a second gear portion 47 and an axle portion 49 for connecting the gear portions 45, 47 to each other. The first gear portion 45 meshes with the right helical side gear 17. On the other hand, each of the short helical pinion gears 43 consists of a first gear portion 51 and a second gear portion 53 between which no axle portion is arranged. The first gear portion 51 of the short helical pinion gear 43 is arranged so as to mesh with the left helical side gear 15 while the second gear portion 53 is arranged so as to mesh with the second gear portion 47 of the long helical pinion gear 41.

In operation, a driving force to rotate the differential casing 3 is transmitted from the engine and distributed into the left and right drive shafts through the helical pinion gears 41, 43 and the sequent helical side gears 15, 17. For example, due to the vehicle's driving on a bad road, if there is caused a difference in driving resistance between the left drive shaft and the left drive shaft, the driving force of the engine will be distributed into the left and right drive shafts differentially by rotations of the helical pinion gears 41, 43.

While transmitting the driving torque, respective tips of the helical pinion gears 41, 43 are forced against circumferential inner walls of the bores 37, 39 by their meshing reactive forces with the helical side gears 17, so that frictional resistance is produced between the gears 41, 43 and the bores 37, 39. In addition, due to meshing thrust force between these helical gears, frictional resistance is produced between respective end faces of the helical pinion gears 41, 43 and the differential casing 3, between the helical side gears 15, 17 and the differential casing 3 through the thrust washers 33, 33 and furthermore, between the helical side gear 15 and the helical side gear 17 through the trust washer 35. In this way, a "torque-responsive" type of differential limiting function of the differential apparatus 1 can be realized by the above frictional resistance.

The differential casing 3 is provided with openings 57 and 59. The differential casing 3 further has spiral-shaped oil grooves 61, 61 formed on the inner peripheries of the boss parts 11, 13. During the rotation of the differential apparatus 1, the oil splattered from the oil reservoir flows in and out of the differential casing 3 through the openings 55, 57, 59 and the oil grooves 61, 61 thereby to lubricate respective the bores 37, 39 and meshing parts of the respective helical gears in the differential apparatus 1.

While the vehicle is traveling forward, the differential casing 3 rotates to a direction from each short helical pinion gear 43 toward each long helical pinion gear 41. Under such a condition, the short helical pinion gears 43 correspond to ones on the side of high reactive force, while the long helical pinion gears 41 correspond to ones on the side of low reactive force, revolving precedingly with respect to the rotating direction of the differential casing 3. Then, due to both meshing reactive forces exerted on the first gear portions 45 from the right helical side gear 17 and meshing reactive forces exerted on the second gear portions 47 from the second gear portions 53 of the helical pinion gears 43, the long helical pinion gears 41 are subject to tipping torque for tumble.

Figure 8:
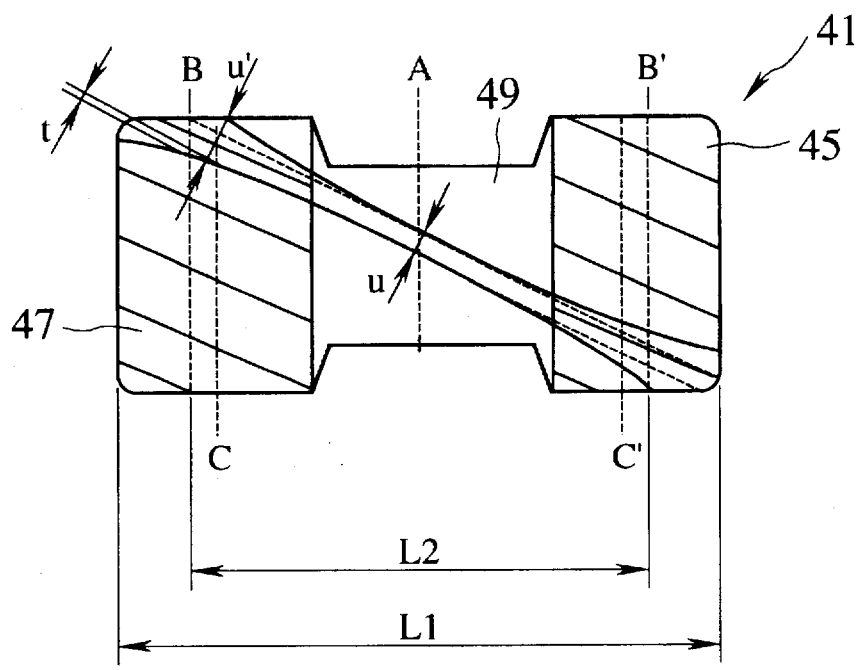
FIG. 8 is a side view of a long pinion gear in the differential apparatus of FIG. 7.

Therefore, according to the embodiment, the first and second gear portions 45, 47 of each long helical pinion gear 41 are taper-shaped so that the tip thickness is gradually decreased from each axial end thereof toward the other gear portion, as shown in FIG. 8.

In FIG. 8;

L1 is a whole "tooth" width of the pinion gear 41;

L2 is 80 percent of the whole width L1 (a distance between points B and B');

t is an inclination of taper at the point B (or B');

u is a tooth thickness along pitch diameter at a point A (a center of the whole tooth width L1); and u' is a tooth thickness along pitch diameter at points C, C'( the vicinities of the respective centers of the tooth width of the gear portions 45, 47).

Regarding a determination of the taper amount, it is established at the points B, B' corresponding to 80% of the whole tooth width L1. In fact, since the tooth thickness u' at the respective points C, C' is larger than the tooth thickness u for its tapered configuration, an imaginary addendum modification coefficient is so established that the thickness u' amounts to a predetermined value. In addition, since lead face (surface of tooth trace) due to the tapered configuration exhibits a curved face, the taper amount is determined in a manner that tangential angle at each point C, C' 7 will be a correction angle. Further, the taper amount is also determined taking account of a clearance between the helical pinion gear 41 and the bore 37.

Figure 1:
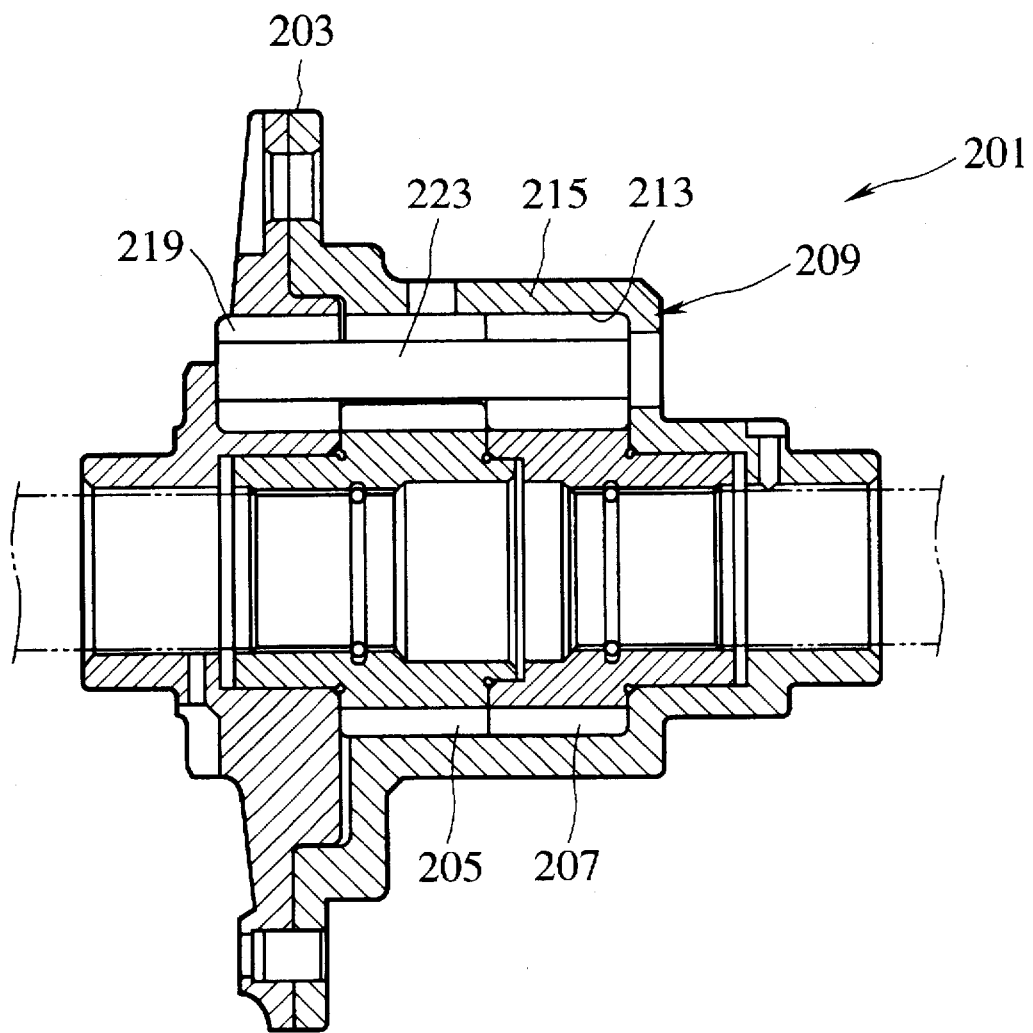
FIG. 1 is a longitudinal sectional view of the prior art differential apparatus.
Figure 2:
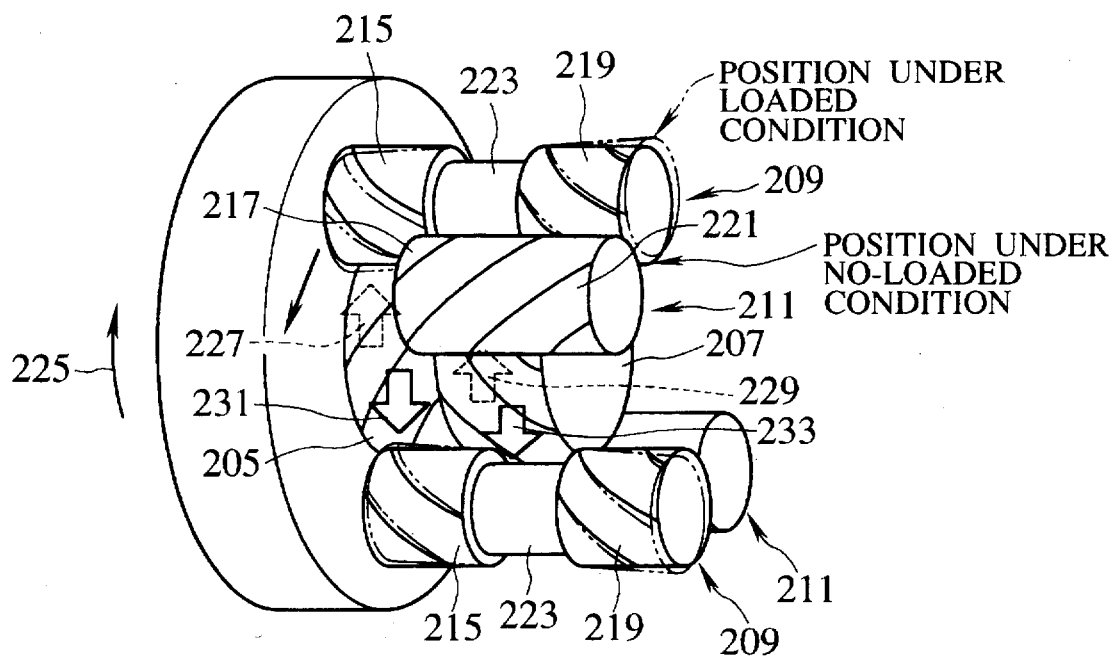
FIG. 2 is a perspective view of a gear assembly of FIG. 1, showing slanted pinion gears of the gear assembly.
Figure 3:
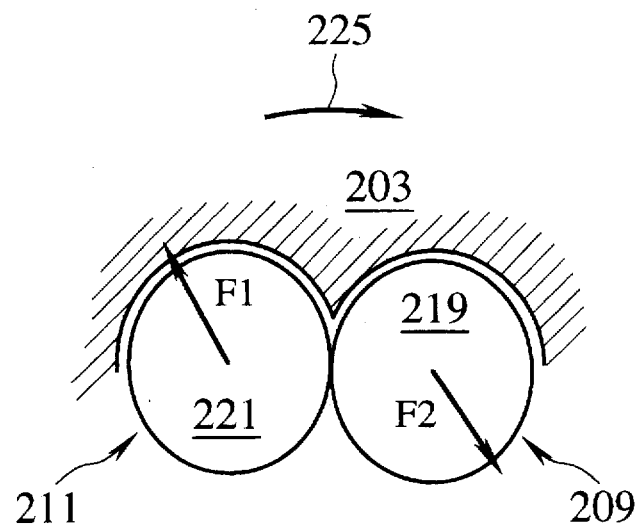
FIG. 3 is a partial cross sectional view of the differential apparatus of FIG. 1, showing respective directions of reactive forces produced between the meshing pinion gears.
Figure 4:
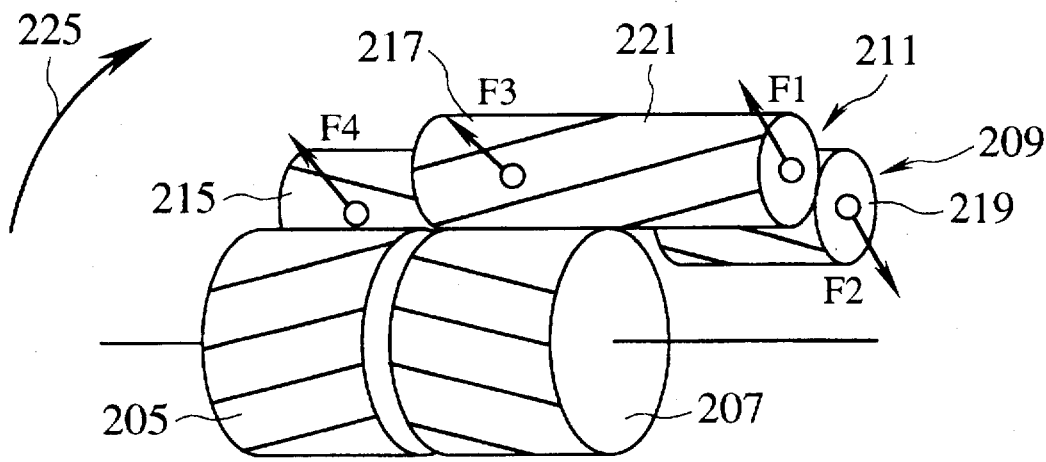
FIG. 4 is a perspective view of the gear assembly in the differential apparatus of FIG. 1, showing respective directions of reactive forces produced between the meshing long and short pinion gears.
Figure 5:
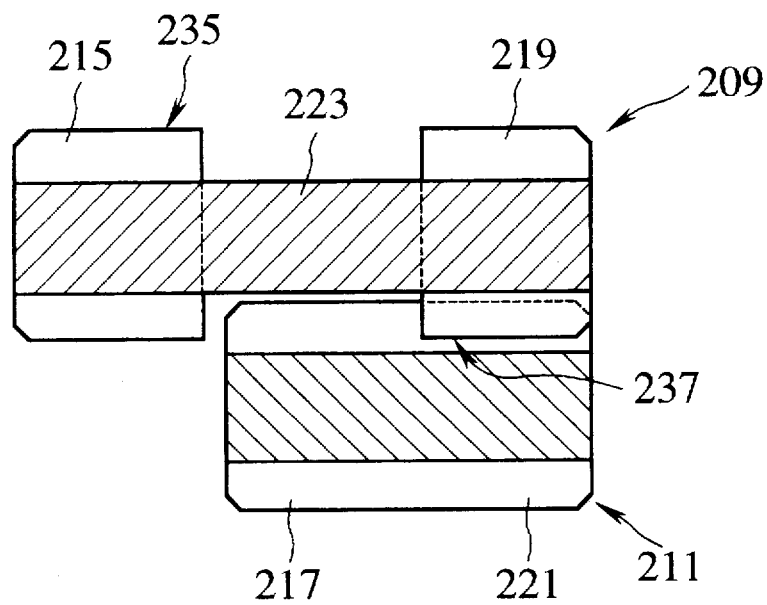
FIG. 5 is a side view of the gear assembly in the differential apparatus of FIG. 1, showing respective positions of deviated bearing area caused by the inclined pinion gear.
Figure 6:
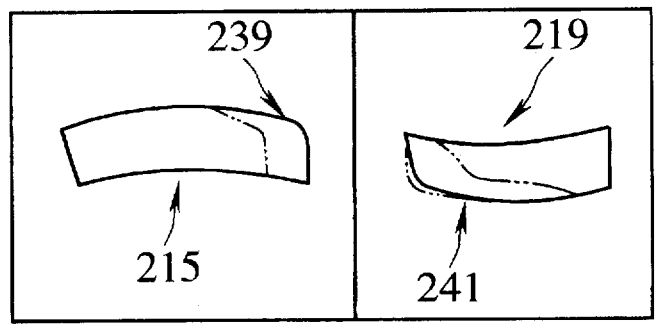
FIG. 6 is a diagram showing respective positions of pitching produced in tooth bearing portions of the pinion gears of FIG. 5.

With such a tapered configuration, the first and second gear portions 45, 47 of the helical pinion gear 41 are formed to have concave helix angles, as shown with thick full-lines of FIG. 8, while the conventional configuration of helix angle is shown with dotted lines in the figure. Consequently, such tooth bearing areas 63, 65 as shown in FIG. 9 can be obtained in the gear portions 45, 47, being in contact with the helical side gear 17 and the second gear portion 53 of the helical pinion gear 43 in substantial areas, respectively. Different from the conventional example shown in FIG. 6, it is possible to prevent an occurrence of deviated bearing and pitching, whereby the durability can be improved remarkably.

In this way, the differential apparatus 1 of the embodiment is constructed.

If the differential apparatus 1 of the embodiment is applied to the vehicle, it would be possible to stabilize the motion of a not-shown vehicle body under a large torque at the vehicle's accelerating, decelerating or the like because of its torque-responsive type differential-limiting function and furthermore, to realize the improved operability and stability for the vehicle over a long period of time.

Figure 10:
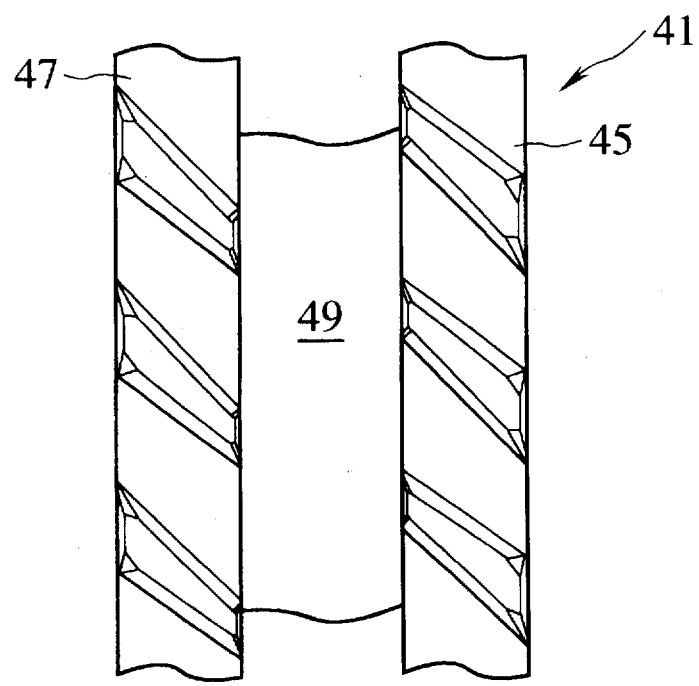
FIG. 10 is an unfolded diagram showing a long pinion gear in a differential apparatus in accordance with a second embodiment of the present invention.
Figure 11:
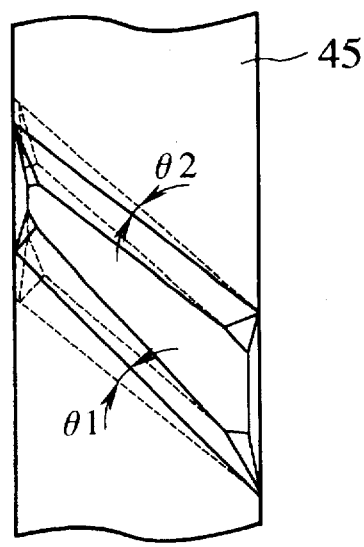
FIG. 11 is an enlarged view of a part of FIG. 10.
Figure 12:
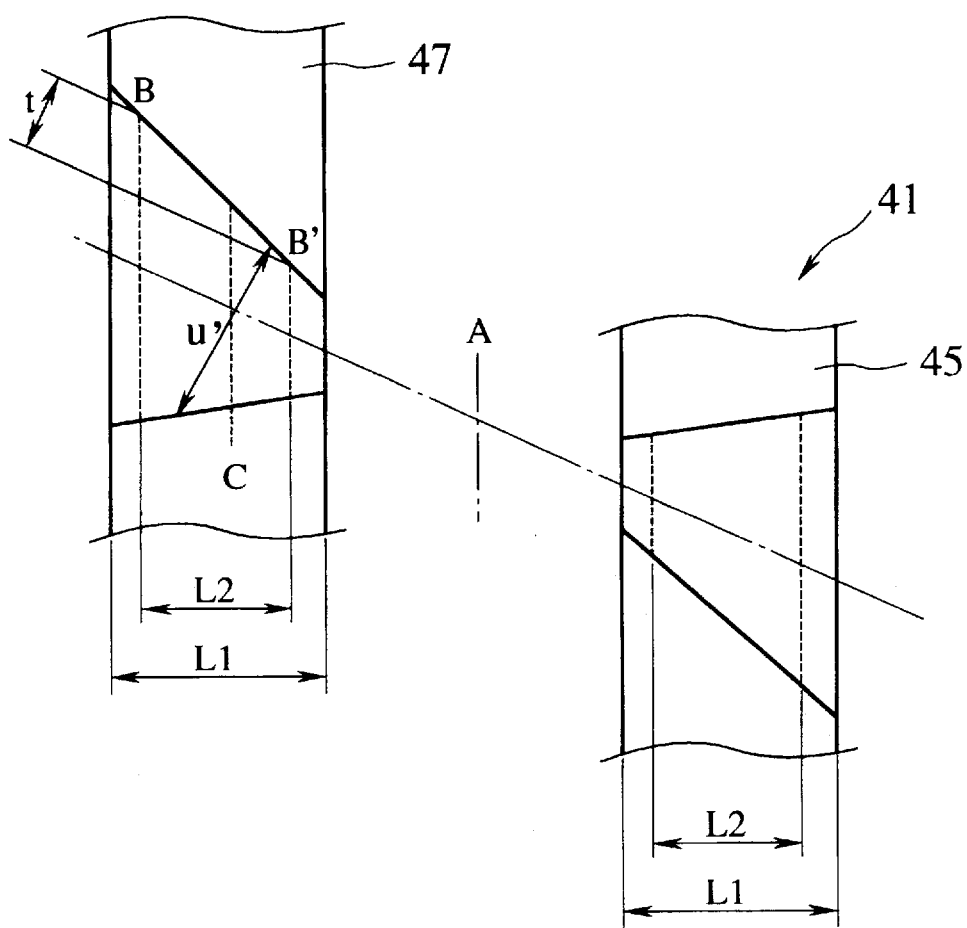
FIG. 12 is an explanatory diagram showing the long pinion gear in accordance with the second embodiment of the present invention.

We now describe a second embodiment with reference to FIGS. 10 to 12.

Note, in figures described hereinafter, elements similar to those elements in the first embodiment are indicated with the same reference numerals and their functional descriptions will be eliminated.

FIG. 10 shows an unfolded long helical pinion gear 41 on the low reactive force side in accordance with the second embodiment, which revolves precedingly with respect to the rotating direction of the differential casing 3 while traveling forward.

Similarly to the first embodiment, the long helical pinion gear 41 is accommodated to frictionally rotate in the long bore 37 of the differential casing 3. The helical pinion gear 41 consists of the first gear portion 45, the second gear portion 47 and the axle portion 49 for connecting the gear portions 45, 47 to each other. The first gear portion 45 meshes with the right helical side gear 17, while the second gear portion 47 meshes with the second gear portion 53 of the short helical pinion gear 43.

While the vehicle is traveling forward, the differential casing 3 rotates to a direction from each short helical pinion gear 43 toward each long helical pinion gear 41. Therefore, the long helical pinion gears 41 are subject to tipping torque resulting from meshing reactive forces exerted on the first and second gear portions 45, 47, so that the gears 41 tumble with respect to their rotational axes, respectively.

According to the second embodiment, the first and second gear portions 45, 47 of each long helical pinion gear 41 are taper-shaped so that the tip thickness is gradually decreased from each axial end thereof toward the other gear portion. As shown in FIG. 11, each of the teeth of the embodiment is formed so that the opposing tooth faces are inclined by inclination angles of θ1, θ2 in comparison with the normal tooth traces shown with dotted lines in the figure.

Although there is only shown the first gear portion 45 in FIG. 11, the tapered configuration of the second gear portion 47 is identical to that obtained by rotating the first gear portion 45 by 180°. Thus, an inclination angle of upper tooth face in the first gear portion 45 is equal to that of the lower tooth face in the second gear portion 47 while the inclination angle of lower tooth face in the first gear portion 45 is equal to that of the upper tooth face in the second gear portion 47.

As shown in FIG. 12, such a tapered configuration of the embodiment is determined by specifying a taper amount t between respective points B and B' defining the tooth width L2 corresponding to 80% of the whole tooth width L1 of each tooth while specifying a tooth thickness u' along pitch diameter at a point C in the vicinity of a center of the tooth width.

Figure 9:
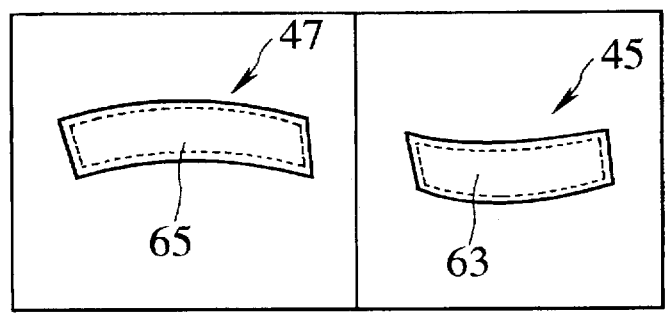
FIG. 9 is a diagram showing respective tooth bearing areas of pinion gears in the differential apparatus of FIG. 7.

Comparing the above second embodiment with the aforementioned first embodiment, it will be understood that the "pitching" due to the deviated bearing face can be further prevented thereby to improve a durability of the differential apparatus 1 in comparison with the first embodiment, since the gear portion 45 of the second embodiment comes into uniform contact with the side gear 17 through the tooth bearing area 63 shown in FIG. 9 while the gear portion 45 of the first embodiment comes into a bit intense contact with the side gear 17 at both axial ends of the portion 45 because of its curved concave tooth face.

Figure 13:
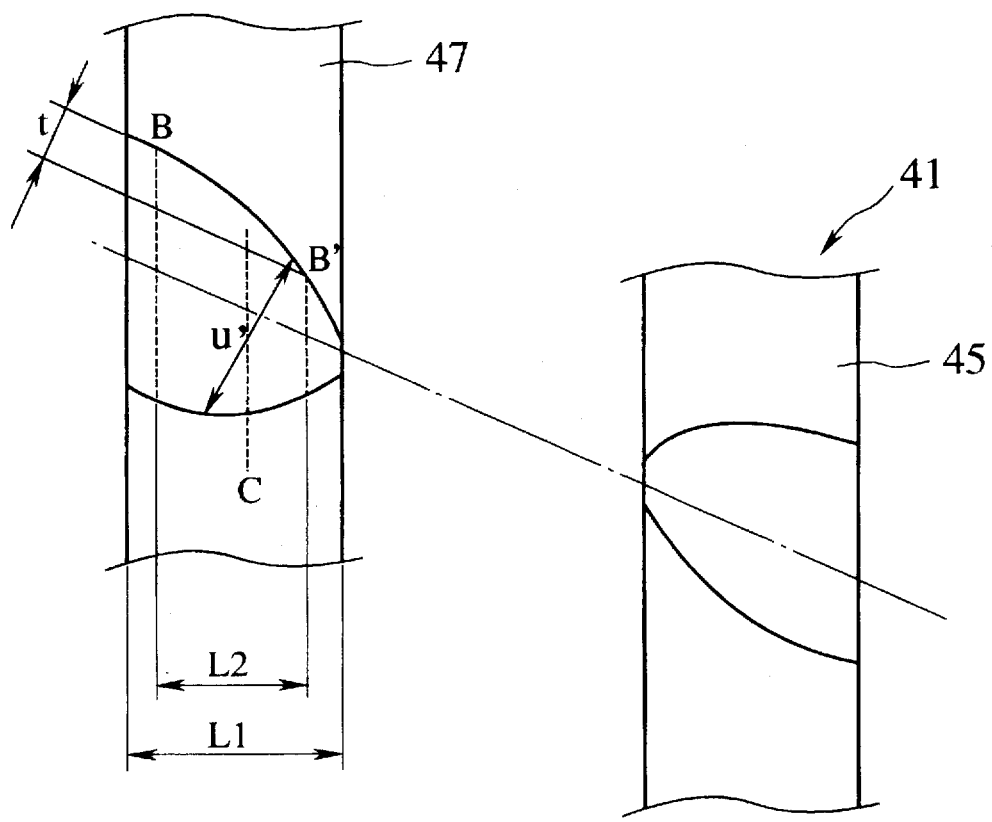
FIG. 13 is an explanatory diagram showing a long pinion gear in a differential apparatus in accordance with a third embodiment of the present invention.

We now describe a third embodiment with reference to FIG. 13.

FIG. 13 also shows an unfolded long helical pinion gear 41 on the low reactive force side, which revolves precedingly with respect to the rotating direction of the differential casing 3 while traveling forward.

According to the third embodiment, the first and second gear portions 45, 47 of the long helical pinion gear 41 are taper-shaped so that the tip thickness of each tooth is gradually decreased along continuously convex curved lines from each axial end thereof toward the other gear portion. The tapered configuration of the second gear portion 47 is identical to that obtained by rotating the first gear portion 45 by 180°. Thus, a profile of the upper tooth face in the first gear portion 45 is similar to that of the lower tooth face in the second gear portion 47 while a profile of the lower tooth face in the first gear portion 45 is similar to that of the upper tooth face in the second gear portion 47.

Also in the embodiment, the above-mentioned tapered configuration is determined by specifying a taper amount t between respective points B and B' defining the tooth width L2 corresponding to 80% of the whole tooth width L1 of each tooth while specifying a tooth thickness u' along pitch diameter at a point C in the vicinity of a center of the tooth width.

Although it is expected that if the pinion gear 41 is slanted extremely, the gear portions 45, 47 of the first and second embodiments would be in intensive contact with the companying gear at both axial ends, the "pitching" at the respective axial ends can be excluded thereby to improve a durability of the differential apparatus 1 since the ends of the gear portions 45, 47 of the third embodiment are shaped so as to escape from the companying gears.

Additionally, it should be noted that although such a tapered configuration is applied to both first gear portions 45, 69, 93 and second gear portions 47, 71, 95 through the above-mentioned three embodiments, it may be applied to either of the first and second gear portions in a modification.

Again, although the pair of pinion gears are constituted by the long and short pinion gears through the above-mentioned embodiments, they may be replaced with pinion gears of the same length, which mesh with each other in a space defined between the side gears in a modification. Alternatively, they may be constituted by a pair of pinion gears of the same length, which mesh within each other on both sides of the side gears in the axial direction.

Although the tapered configuration of the invention is applied to the long pinion gear in any one of the above-mentioned embodiments, it may be applicable to the short pinion gear. As mentioned above, the short pinion gear is apt to have the pitching phenomenon because of its increased inclination angle. In even a case, however, tooth-bearing function of the defferential apparatus can be improved to reduce a possibility of the occurrence of pitching, owing to the tapered configuration of the pinion gear. Thus, the durability of the apparatus can be improved remarkably.

Figure 14:
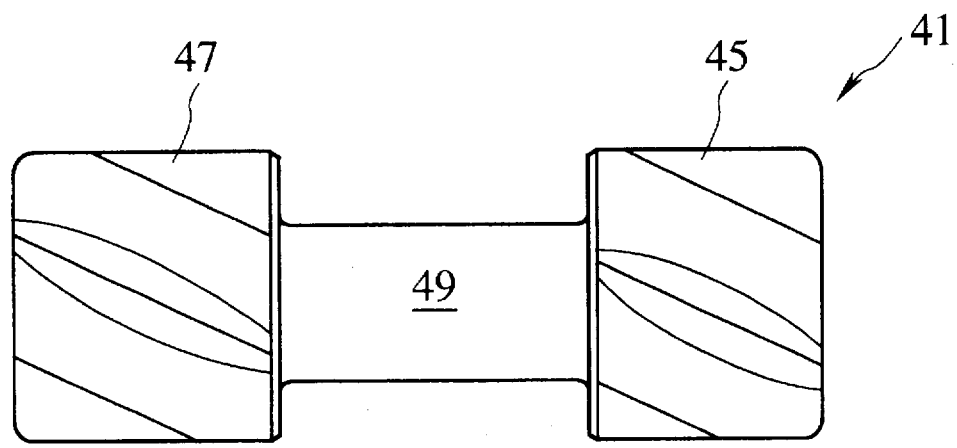
FIG. 14 is a side view of a long pinion gear in the differential apparatus in accordance with a fourth embodiment of the present invention.
Figure 15:
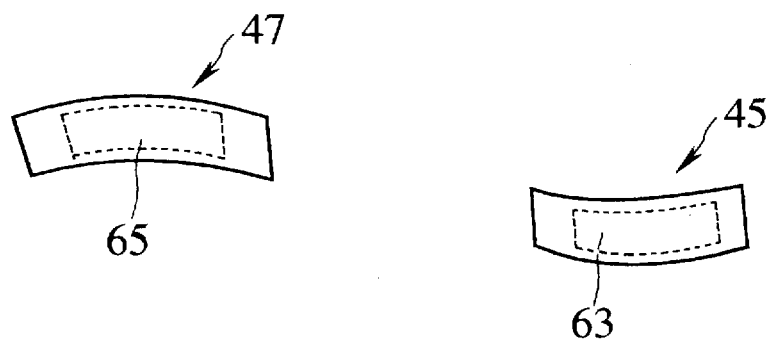
FIG. 15 is a diagram showing respective tooth bearing areas of the long pinion gear of FIG. 14; is a perspective view of a gear assembly of a differential apparatus in accordance with a second embodiment of the present invention.

We now describe a fourth embodiment with reference to FIGS. 14 and 15.

FIG. 14 is a plan view showing the long helical pinion gear 41 which revolves precedingly with respect to the rotating direction of the differential casing 3 (FIG. 7) while traveling forward.

According to the fourth embodiment, in the first and second gear portions 45, 47 of the long helical pinion gear 41, each of gear teeth thereof is formed in a convex curve so that the tip thickness reaches a maximum at the middle point of the axial length of each gear portion, as shown in FIG. 14. With the configuration each gear tooth in a convex curve, sufficient tooth bearing areas 63, 65 shown with dotted line of FIG. 15 can be ensured in contact between the gear portion 45 and the helical side gear 17 and in contact between the gear portion 47 and the second gear portion 53 of the helical pinion gear 43. Different from the conventional example shown in FIG. 6, it is possible to prevent an occurrence of deviated bearing and pitching, whereby the durability can be improved remarkably.

In this way, the differential apparatus 1 of the fourth embodiment is constructed.

If the differential apparatus 1 of the embodiment is applied to the vehicle, it would be possible to stabilize the motion of a not-shown vehicle body under a large torque at the vehicle's accelerating, decelerating or the like because of its torque-responsive type differential-limiting function and furthermore, to realize the improved operability and stability for the vehicle over a long period of time.

Figure 16:
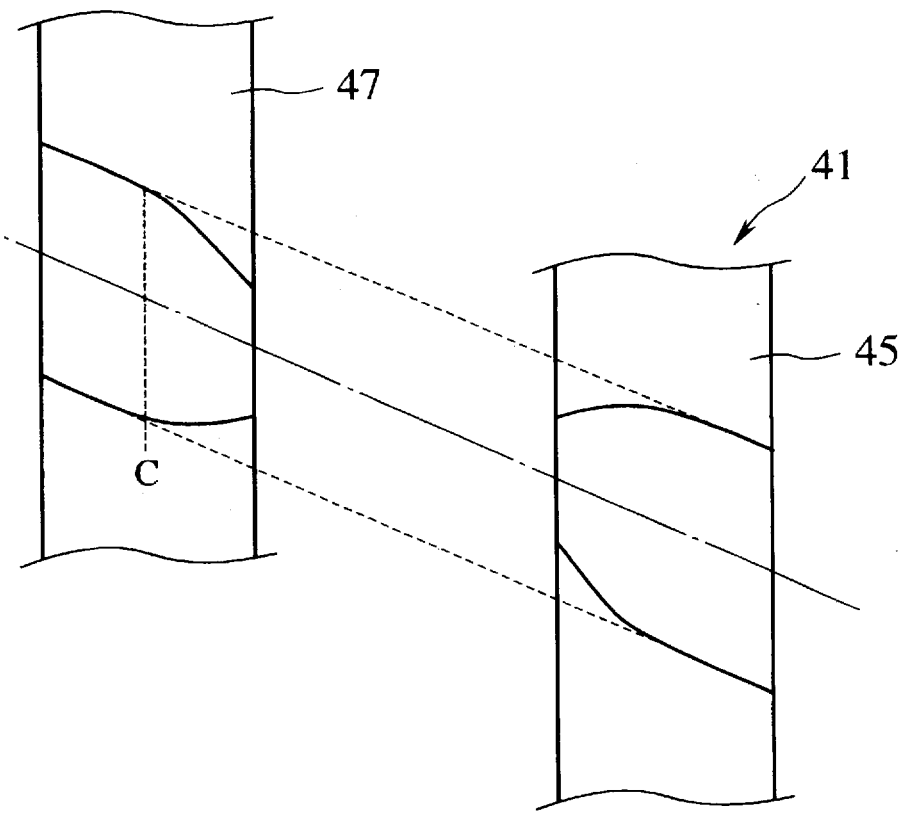
FIG. 16 is an explanatory diagram showing an unfolded long pinion gear in a differential apparatus in accordance with a fifth embodiment of the present invention.

We now describe a fifth embodiment with reference to FIG. 16.

FIG. 16 also shows the long helical pinion gear 41 which revolves precedingly with respect to the rotating direction of the differential casing 3 while traveling forward.

According to the fifth embodiment, in the first and second gear portions 45, 47 of the long helical pinion gear 41, respective gear teeth are shaped in continuously convex curves in a manner that the tip thickness of each gear tooth is gradually decreased from the vicinity of the axial center C of the gear portion 45 (or 47) toward the other gear portion 47 (or 45). Note, in the shown embodiment, respective gear teeth of the gear portions 45, 47 are so shaped that a left tooth face of each gear tooth in the rotating direction of the pinion gear 41 has a curvature different from the curvature of the right tooth face of the gear tooth. In addition, the curved configuration of the second gear portion 47 is identical to that obtained by rotating the first gear portion 45 about a not-shown midpoint between the portions 45 and 47 by 180°. In other words, the curvature of each tooth face on one side of each gear tooth in the first gear portion 45 is equal to that of each tooth face on the opposite side of each gear tooth in the second gear portion 47. Similarly, the curvature of the tooth face on the opposite side of each gear tooth in the first gear portion 45 is equal to that of the tooth face on one side of the gear tooth in the second gear portion 47.

In this way, since the first and second gear portions 45, 47 of the pinion gear 41 are formed so as to have the left and right tooth faces of different curvatures in the rotating direction of the pinion gear 41, it is possible to increase the tooth thickness of each gear tooth in the gear portions 45, 47 in comparison with that of each gear tooth in case of identical curvatures, whereby the durability of the differential apparatus 1 can be improved.

Further, owing to the above formation of the first and second gear portions 45, 47, even if such a convex formation is applied to the only pinion gear 41, it is possible to prevent an occurrence of local contact of the gear teeth at respective axial ends thereof, which would be caused by the inclination of the helical pinion gears 41, 43, irrespective of the rotating direction of the differential casing 3, so that the occurrence of pitching can be prevented to improve the durability of the differential apparatus 1.

In addition, since the above-mentioned curved configuration is provided in the gear portion on the only side opposing the other gear portion, the sufficient tooth-bearing area in each tooth face can be ensured thereby to improve the durability of the apparatus 1 even if no inclination is raised in the helical pinion gears 41, 43.

Figure 17:
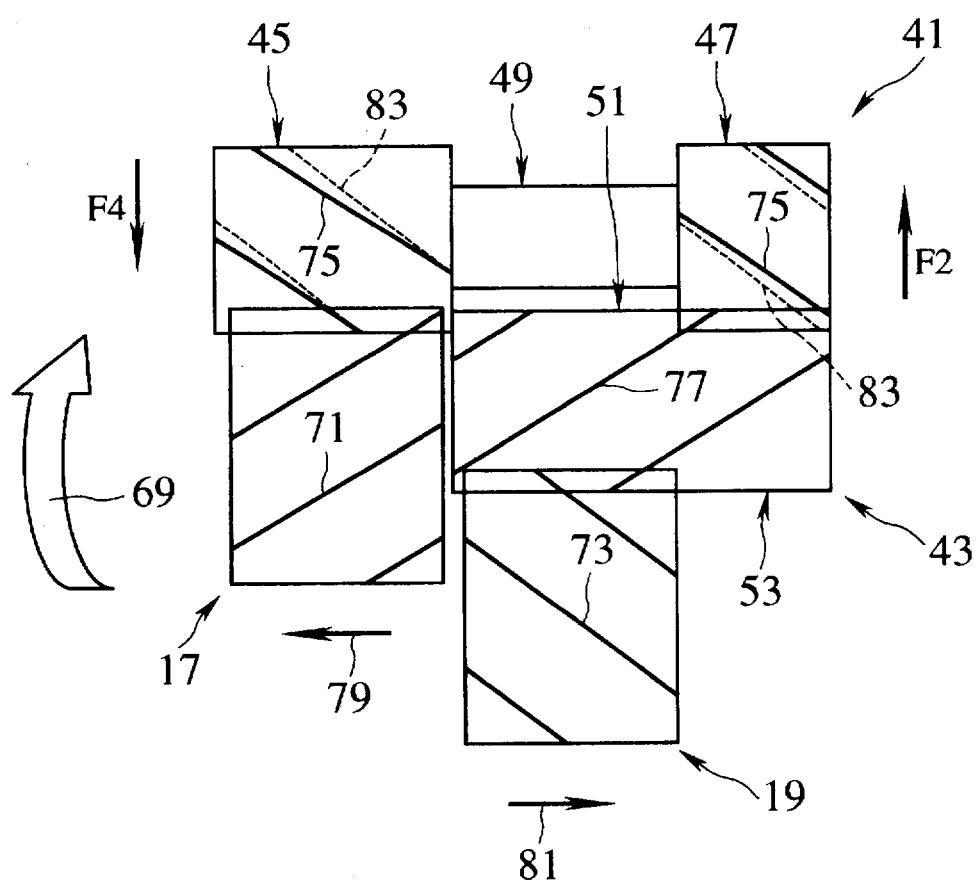
FIG. 17 is an explanatory diagram showing a gear assembly in a differential apparatus in accordance with a sixth embodiment of the present invention.

We now describe a sixth embodiment with reference to FIG. 17.

FIG. 17 shows the helical pinion gears 41, 43 which revolves around the side gears 17, 19.

As mentioned above, while the differential casing 3 is rotated in the direction 69, the preceding long pinion gear 41 is inclined so that an angle of each tooth trace 75 increases by meshing reactive forces F4, F2 exerted on the first and second gear portions 45, 47. Therefore, according to the embodiment, respective gear teeth of the pinion gear 41 are formed in such a manner that an angle of each tooth trace 75 is corrected to be smaller than that of the conventional tooth trace 83 (shown with a dotted line) by the inclination angle of the inclined pinion gear 41, conversely.

If parameters of the pinion gear 41 are expressed as follows an angle of inclination of the gear 41: $\Delta 1$ an inner diameter of the bore 37: Dc an outer diameter of the bore 41: D1 a length of the pinion gear 41: L1 a length of the axle portion 49: L1', then, the angle $\Delta 1$ will be revealed by an expression as follows.

$$\Delta 1 = \sin^{-1}[(Dc-D1)/(L1-L1')]$$

Therefore, for example, providing that the distance L1–L1' between bearing points of the pinion gear 41 of 39 mm, the radial distance Dc-D1 of 0.1 mm are given, then the inclination angle $\Delta 1$ is:

$$\Delta 1 = \sin^{-1}[(0.1)/(38)] = 0.15 (deg)$$

Then, taking processing tolerance of ±0.05 deg into account, the resulting angle $\Delta 1$ will be as below:

$$0.10 \leq \Delta 1(deg) \leq 0.20$$

In this way, it is found that the inclination angle $\Delta 1$ of the pinion gear 41 is determined by the radial distance (Dc-D1), while the larger a distance of L1–L1 ' is changed, the larger a torque for inclining the pinion gear 41 becomes. Further, the place where the pitching occurs in inclining depends on both the radial distance Dc-D1 and the distance L1-L1 '. Accordingly, the correction angle of the tooth trace 75 is determined by the inclination angle $\Delta 1$ based on the above factors, taking a range of the processing tolerance into consideration.

Owing to the above-mentioned correction with respect to the tooth trace, an inclination of the long pinion gear 41 caused during the vehicle's forward traveling can be canceled, so that it is possible to realize the normal meshing operation with the side gear 17 and the pinion gear 43 under the inclined condition of the gear 41. It is noted that there is very little inclination about the short pinion gear 43 revolving following the gear 41.

In this way, it is possible to prevent an occurrence of deviated bearing and pitching in all meshing areas of the respective gears, whereby the durability can be improved. In addition, different from the conventional differential apparatus, the manufacturing cost can be saved all the more because there is no need to increase the strength of the respective gears in order to prevent the occurrence of pitching. By correcting the angles of tooth traces of the long pinion gear 41 which is subject to a large tipping torque, it is possible to prevent the occurrence of pitching remarkably.

Since the respective gear portions 45, 47 have the tooth traces 75 identical to each other in the embodiment, it is possible to obtain these portions 45, 47 by gear-cutting simultaneously. Furthermore, since the above-mentioned correction of the tooth traces 75 is carried out while this gear-cutting, it does not involve an increase in manufacturing cost.

In this way, the differential apparatus 1 of the embodiment is constructed. When the differential apparatus 1 of the embodiment is applied to the vehicle, it would be possible to stabilize the motion of a not-shown vehicle body under a large torque at the vehicle's accelerating, decelerating or the like because of its torque-responsive type differential-limiting function and furthermore, to realize the improved operability and stability for the vehicle over a long period of time.

Figure 18:
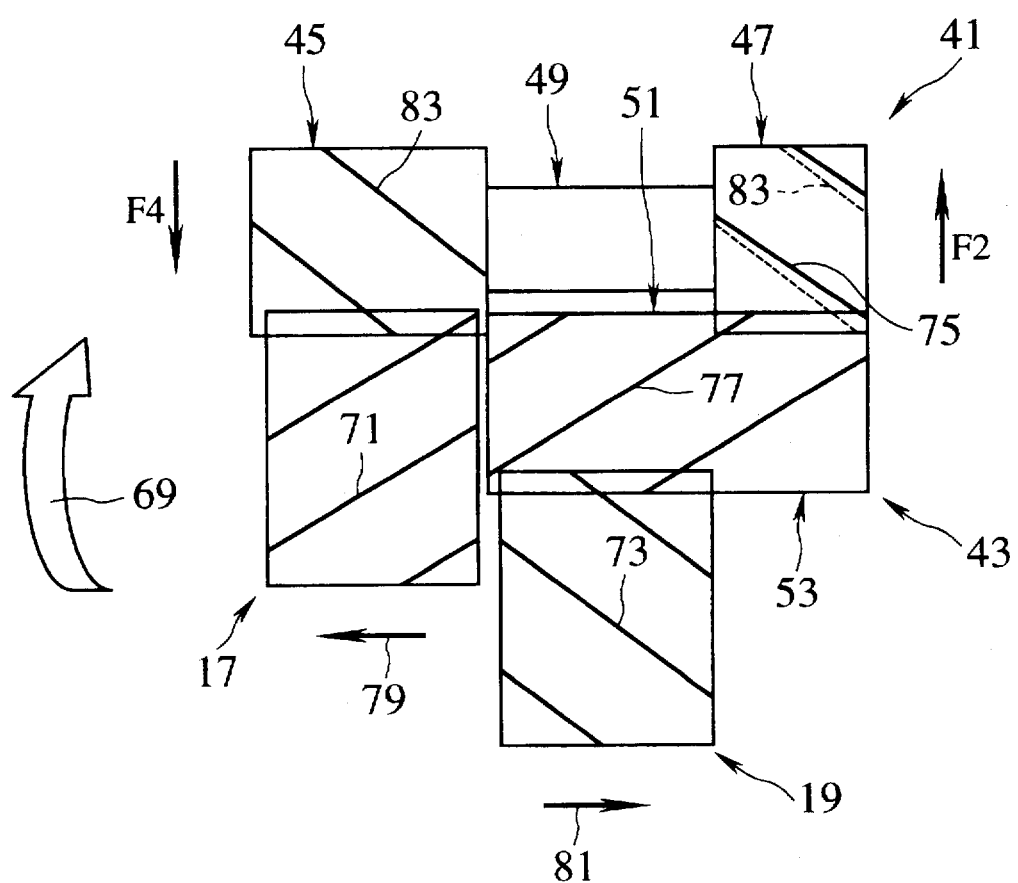
FIG. 18 is an explanatory diagram showing a gear assembly in a differential apparatus in accordance with a seventh embodiment of the present invention.

FIG. 18 shows the helical pinion gear 41 in accordance with a seventh embodiment of the present invention.

As similar to the sixth embodiment of the invention, while the vehicle is traveling forward, the differential casing 3 rotates in the direction 69.

It should be noted that the above-mentioned deviated bearing phenomenon is remarkable in mashing area between the second gear portion 47 and the gear portion 53. Therefore, according to the embodiment, the second gear portion 47 of the pinion gear 41 is processed in such a manner that an angle of each tooth trace 75 is corrected to be smaller than that of the not-corrected tooth trace 83 by the inclination angle of the inclined pinion gear 41.

The correction angle of the tooth trace 75 is determined on a basis of the radial distance Dc-D1 and the distance L1-L1' of the helical long pinion gear 41, as similar to the pinion gear 41 of FIG. 17.

Owing to the above-mentioned correction with respect to the tooth trace, an inclination of the long pinion gear 41 caused during the vehicle's forward traveling can be canceled at the second gear portion 47, so that it is possible to realize the normal meshing operation with the pinion gear 43 under the inclined condition of the gear 41. It is noted that there is very little inclination about the short pinion gear 43 revolving following the gear 41.

In this way, by only correcting the tooth traces of the gear portion 47, it is possible to prevent an occurrence of deviated bearing and pitching effectively. In addition, different from the conventional differential apparatus, the manufacturing cost can be saved all the more because there is no need to increase the strength of the respective gears in order to prevent the occurrence of pitching.

Note, since the respective gear portions 45, 47 have the tooth traces 83, 75 different from each other, the gear-cutting processes are carried out separately. However, since the gear portion 47 of the embodiment can be obtained by gear-cutting upon correcting the angle of tooth traces from the beginning and no further correction gear-cutting is required, it does not involve an increase in manufacturing cost.

An eighth embodiment of the present invention will be described with reference to FIG. 19.

Figure 19:
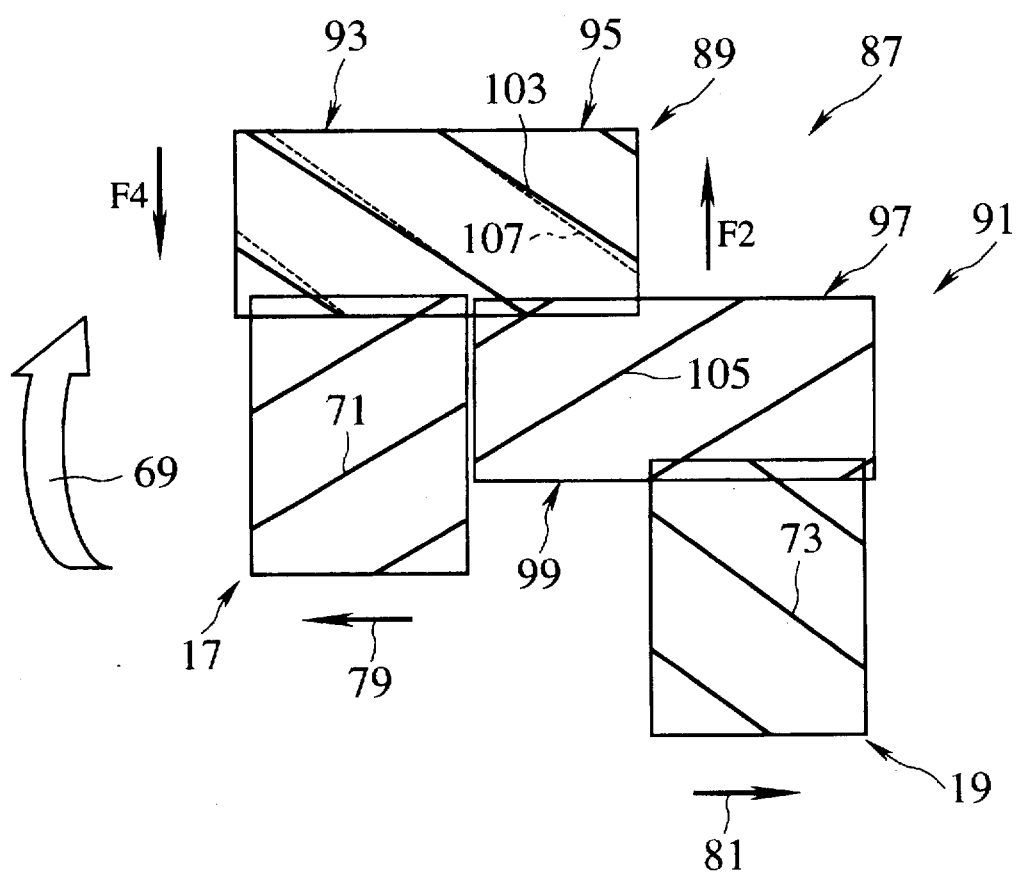
FIG. 19 is an explanatory diagram showing a gear assembly in a differential apparatus in accordance with an eighth embodiment of the present invention.

FIG. 19 shows a gear assembly 87 used in the differential apparatus 1 in accordance with the eighth embodiment. This gear assembly 87 consists of helical pinion gears 89, 91 of the same length and the helical side gears 17, 19.

The helical pinion gears 89, 91 are composed of first and second gear portions 93, 95, 97, 99. While the vehicle is traveling forward, the helical pinion gear 89 on the low reactive force side revolves precedingly with respect to the rotating direction 69 of the differential casing 3. The first gear portion 93 of the helical pinion gear 89 meshes with the right helical side gear 17, while the first gear portion 97 of the helical pinion gear 91 meshes with the right side gear 19. Further, the second gear portions 95, 99 of the helical pinion gears 89, 91 mesh with each other.

According to the embodiment, respective gear teeth of the pinion gear 89 are formed in such a manner that an angle of each tooth trace 103 is corrected to be smaller than that of the conventional tooth trace 107 (shown with a dotted line) by the inclination angle of the inclined pinion gear 89, conversely.

If parameters of the pinion gear 89 are expressed as follows;

an angle of inclination of the gear 89: $\Delta s$ an inner diameter of the bore: Dc an outer diameter of the bore 89: Ds a length of the pinion gear 89: Ls, then, the angle $\Delta s$ will be revealed by an expression as follows.

$$\Delta 1 = \sin^{-1}[(Dc-Ds)/Ls]$$

In this way, it is found that the inclination angle $\Delta s$ of the pinion gear 89 is determined by the radial distance (Dc-Ds) and the larger the length Ls of the pinion gear 89 becomes, the larger a torque for inclining the pinion gear 41 becomes. Further, the place where the pitching occurs in inclining depends on both the radial distance Dc-D1 and the length Ls. Accordingly, the correction angle of the tooth trace 103 is determined by the above factors.

Owing to the above-mentioned correction with respect to the tooth trace, an inclination of the pinion gear 89 caused during the vehicle's forward traveling can be canceled, so that it is possible to realize the normal meshing operation with the side gear 17 and the pinion gear 91 under the inclined condition of the gear 89. It is noted that there is very little inclination about the pinion gear 91 revolving following the gear 89.

In this way, it is possible to prevent an occurrence of deviated bearing and pitching in all meshing areas of the respective gears, whereby the durability can be improved. In addition, different from the conventional differential apparatus, the manufacturing cost can be saved all the more because there is no need to increase the strength of the respective gears in order to prevent the occurrence of pitching. Moreover, since the pinion gear 89 of the embodiment is provided by gear-cutting upon correcting the angle of tooth traces from the beginning and no further correction gear-cutting is required, it does not involve an increase in manufacturing cost.

A ninth embodiment in accordance with the present invention is now described with reference to FIG. 20.

Figure 20:
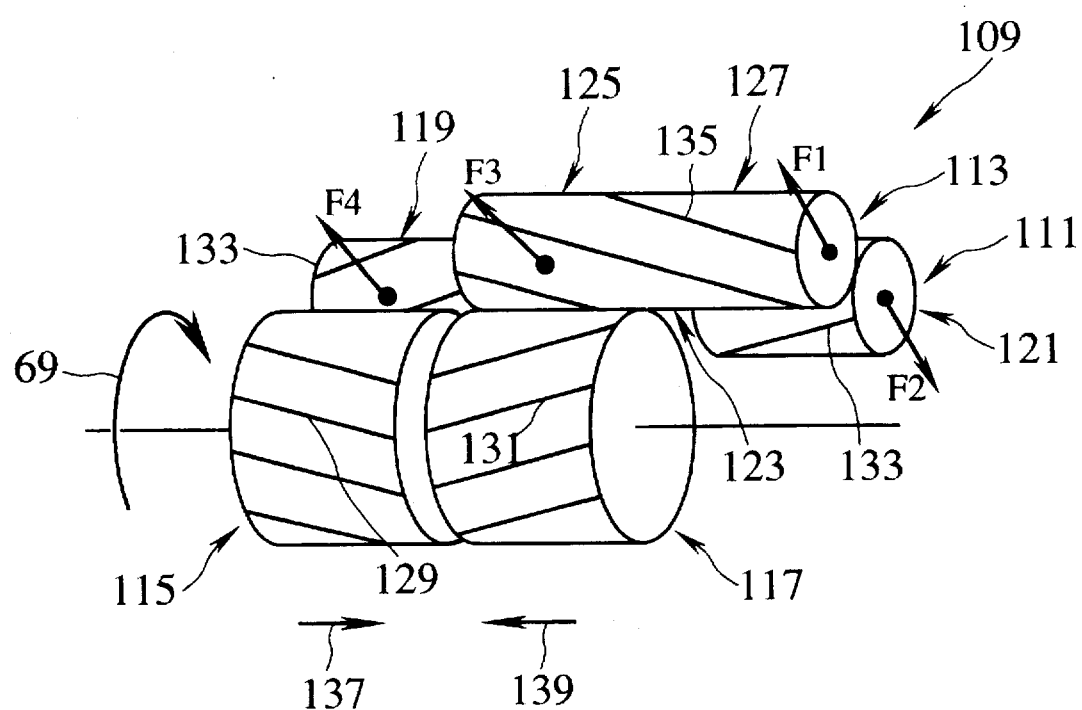
FIG. 20 is a perspective view of a gear assembly in a differential apparatus in accordance with a ninth embodiment of the present invention.

FIG. 20 shows a gear assembly 109 used in the differential apparatus 1 in accordance with the ninth embodiment. This gear assembly 109 consists of a pair of long and short helical pinion gears 111, 113 and a pair of helical side gears 115, 117.

As shown in the figure, the long helical pinion gear 111 consists of a first gear portion 119, a second gear portion 121 and an axle portion 123 for connecting the gear portions 119, 121 to each other. The first gear portion 119 meshes with the left helical side gear 115. On the other hand, the short helical pinion gear 113 consists of a first gear portion 125 and a second gear portion 127. The first gear portion 125 of the short helical pinion gear 113 is arranged so as to mesh with the right helical side gear 117 while the second gear portion 127 is arranged so as to mesh with the second gear portion 121 of the long helical pinion gear 111.

In FIG. 20, there are shown the rotating direction 69 of the differential casing 3 while the vehicle is traveling forward, an arrangement of the pinion gears 111, 113 with respect to the rotating direction 69 and respective directions of tooth traces 129, 131, 133, 135 of the side gears 115, 117 and the pinion gears 111, 113. As shown in FIG. 20, on condition that the vehicle is traveling forward, the long helical pinion gear 111 is arranged so as to rotate in advance of the short helical pinion gears 113 in the rotating direction 59 of the differential casing 3. When the vehicle is traveling forward, the helical side gears 115, 117 are subject to axially inward thrust forces 137, 139 by their meshing operations with the pinion gears 111, 113, due to the directions of tooth traces 129, 131, respectively. Note, in the embodiment, each tooth trace 131 of the long pinion gear 111 is directed to the upward on the right hand.

Thus, since the preceding long pinion gear 111 is inclined so that an angle of each tooth trace 133 decreases by meshing reactive forces F4, F2 exerted on the first and second gear portions 119, 121, according to the embodiment, respective gear teeth of the pinon gear 111 are formed in such a manner that the angle of each tooth trace 133 is increased by the above inclination angle of the inclined pinion gear 111, conversely.

The correction angle of the tooth trace 133 is determined on a basis of the radial distance Dc-D1 against the bore 37 and the distance L1–L1' of the helical long pinion gear 111.

Owing to the above-mentioned correction with respect to the tooth trace, an inclination of the pinion gear 111 caused during the vehicle's forward traveling can be canceled, so that it is possible to realize the normal meshing operation with the side gear 129 and the pinion gear 113 under the inclined condition of the gear 111. It is noted that there is very little inclination about the pinion gear 113 revolving following the gear 111 because of the meshing reactive forces F3, F1 of the same direction.

In this way, it is possible to prevent an occurrence of deviated bearing and pitching in all meshing areas of the respective gears, whereby the durability can be improved. In addition, different from the conventional differential apparatus, the manufacturing cost can be saved all the more because there is no need to increase the strength of the respective gears in order to prevent the occurrence of pitching.

By correcting the angles of tooth traces of the long pinion gear 111 which is subject to a large tipping torque, it is possible to prevent the occurrence of pitching remarkably.

Since the respective gear portions 119, 121 have the tooth traces 133 identical to each other in the embodiment, it is possible to obtain these portions 119, 121 by gear-cutting simultaneously. Moreover, since the respective gear portions 119, 121 of the embodiment are provided by gear-cutting upon correcting the angle of tooth traces from the beginning and no further correction gear-cutting is required, it does not involve an increase in manufacturing cost.

A tenth embodiment in accordance with the present invention is now described with reference to FIG. 21.

Figure 21:
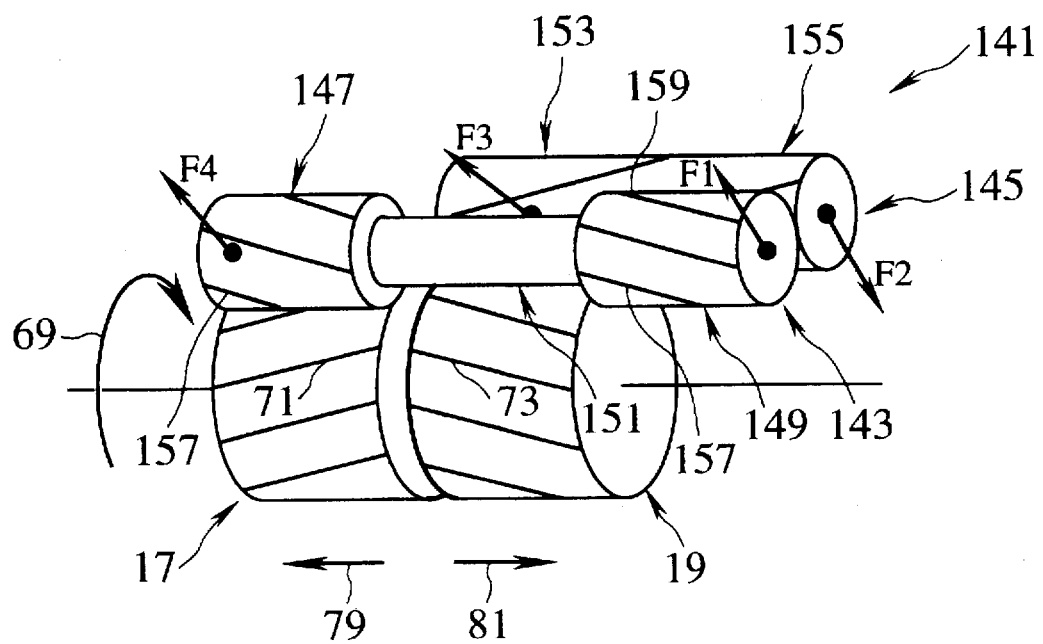
FIG. 21 is a perspective view of a gear assembly in a differential apparatus in accordance with a tenth embodiment of the present invention.

FIG. 21 shows a gear assembly 141 used in the differential apparatus in accordance with the tenth embodiment. This gear assembly 141 consists of a pair of long and short helical pinion gears 143, 145 and the helical side gears 17, 19. The respective pinion gears 143, 145 are accommodated in the bores 37, 39 so as to rotate therein, respectively.

As shown in the figure, the long helical pinion gear 143 consists of a first gear portion 147, a second gear portion 149 and an axle portion 151 for connecting the gear portions 147, 149 to each other. The first gear portion 147 meshes with the left helical side gear 17. On the other hand, the short helical pinion gear 145 consists of a first gear portion 153 and a second gear portion 155. The first gear portion 153 of the short helical pinion gear 145 is arranged so as to mesh with the right helical side gear 19 while the second gear portion 155 is arranged so as to mesh with the second gear portion 149 of the long helical pinion gear 143.

In FIG. 21, there are shown the rotating direction 69 of the differential casing 3 while the vehicle is traveling forward, an arrangement of the pinion gears 148, 145 with respect to the rotating direction 69 and respective directions of tooth traces 71, 78, 157, 159 of the side gears 17, 19 and the pinion gears 148, 145. As shown in FIG. 21, on condition that the vehicle is traveling forward, the short helical pinion gear 145 is arranged so as to rotate in advance of the long helical pinion gears 143 in the rotating direction 69 of the differential casing 3.

Thus, since the preceding short helical pinion gear 145 is inclined so that an angle of each tooth trace 159 decreases by meshing reactive forces F3, F2 exerted on the first and second gear portions 153, 155, according to the embodiment, respective gear teeth of the pinion gear 145 are formed in such a manner that the angle of each tooth trace 159 is increased by the above inclination angle of the inclined pinion gear 145, conversely. The correction angle of the tooth trace 159 is determined on a basis of the radial distance Dc–Ds against the bore 39 and the distance Ls of the helical short pinion gear 145.

Owing to the above-mentioned correction with respect to the tooth trace, an inclination of the pinion gear 145 caused during the vehicle's forward traveling can be canceled, so that it is possible to realize the normal meshing operation with the side gear 19 and the pinion gear 143 even if the gear 145 is inclined. It is noted that there is very little inclination about the pinion gear 141 revolving following the gear 143 because of the meshing reactive forces F4, F1 of the same direction.

In this way, it is possible to prevent an occurrence of deviated bearing and pitching in all meshing areas of the respective gears, whereby the durability can be improved. In addition, different from the conventional differential apparatus, the manufacturing cost can be saved all the more because there is no need to increase the strength of the respective gears in order to prevent the occurrence of pitching. Moreover, since the pinion gear 145 of the embodiment is provided by gear-cutting upon correcting the angle of tooth traces from the beginning and no further correction gear-cutting is required, it does not involve an increase in manufacturing cost.

An eleventh embodiment in accordance with the present invention is now described with reference to FIG. 22.

Figure 22:
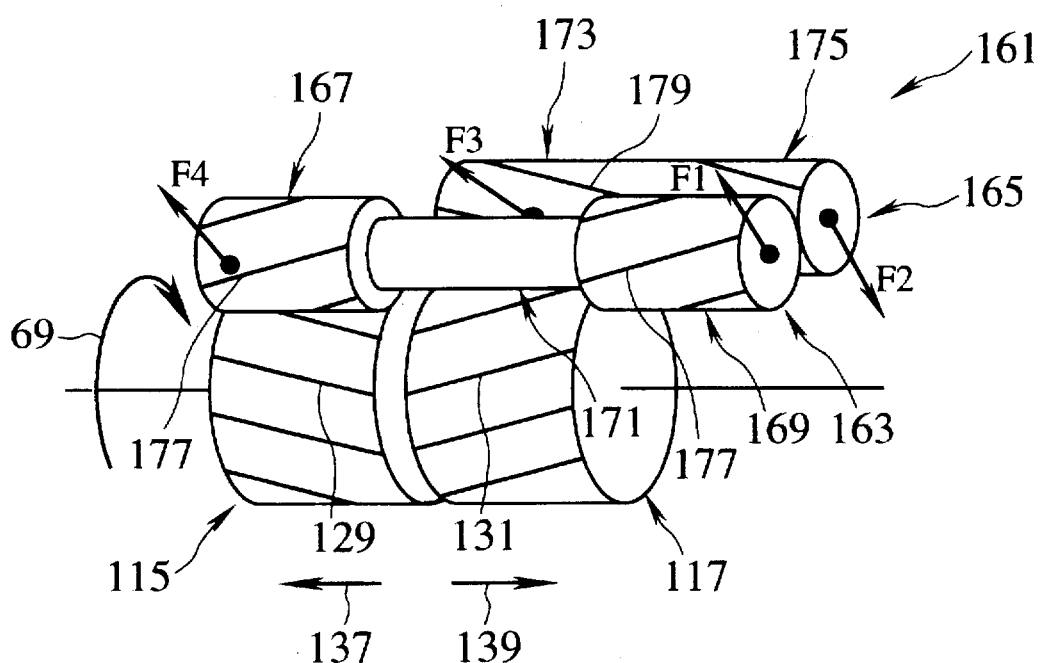
FIG. 22 is a perspective view of a gear assembly in a differential apparatus in accordance with an eleventh embodiment of the present invention.

FIG. 22 shows a gear assembly 161 used in the differential apparatus in accordance with the eleventh embodiment. This gear assembly 161 consists of a pair of long and short helical pinion gears 163, 165 and the helical side gears 115, 117. The respective pinion gears 163, 165 are accommodated in the bores 37, 39 so as to rotate therein, respectively.

As shown in the figure, the long helical pinion gear 163 consists of a first gear portion 167, a second gear portion 169 and an axle portion 171 for connecting the gear portions 167, 169 to each other. The first gear portion 167 meshes with the left helical side gear 115. On the other hand, the short helical pinion gear 165 consists of a first gear portion 173 and a second gear portion 175. The first gear portion 173 of the short helical pinion gear 165 is arranged so as to mesh with the right helical side gear 117 while the second gear portion 175 is arranged so as to mesh with the second gear portion 169 of the long helical pinion gear 163.

In FIG. 22, there are shown the rotating direction 69 of the differential casing 3 while the vehicle is traveling forward, an arrangement of the pinion gears 163, 165 with respect to the rotating direction 69 and respective directions of tooth traces 129, 131, 177, 179 of the side gears 115, 117 and the pinion gears 153, 165. As shown in FIG. 22, on condition that the vehicle is traveling forward, the short helical pinion gear 165 is arranged so as to rotate in advance of the long helical pinion gears 167 in the rotating direction 69 of the differential casing 3.

Thus, since the preceding short helical pinion gear 165 is inclined so that an angle of each tooth trace 179 increases by meshing reactive forces F3, F2 exerted on the first and second gear portions 173, 175, according to the embodiment, respective gear teeth of the pinion gear 165 are formed in such a manner that the angle of each tooth trace 179 is increased by the above inclination angle of the inclined pinion gear 165, conversely. The correction angle of the tooth trace 179 is determined on a basis of the radial distance Dc–Ds against the bore 39 and the distance Ls of the helical short pinion gear 165.

Owing to the above-mentioned correction with respect to the tooth trace, an inclination of the pinion gear 165 caused during the vehicle's forward traveling can be canceled, so that it is possible to realize the normal meshing operation with the side gear 117 and the pinion gear 163 even if the gear 165 is inclined. It is noted that there is very little inclination about the pinion gear 163 revolving following the gear 165 because of the meshing reactive forces F4, F1 of the same direction.

In this way, it is possible to prevent an occurrence of deviated bearing and pitching in all meshing areas of the respective gears, whereby the durability can be improved. In addition, different from the conventional differential apparatus, the manufacturing cost can be saved all the more because there is no need to increase the strength of the respective gears in order to prevent the occurrence of pitching. Moreover, since the pinion gear 165 of the embodiment is provided by gear-cutting upon correcting the angle of tooth traces from the beginning and no further correction gear-cutting is required, it does not involve an increase in manufacturing cost.

In case that the correction angle in respective tooth traces from the 6th. embodiment to the 9th. embodiment is determined on a basis of a radial distance (Dc–Ds) and a length Ls of the helical pinion gear, the correction angle of the invention may be established to be n 165.

Since the above correction angle adopted in the above-mentioned embodiments is very little to improve teeth bearing operation of the differential apparatus, it does not influence the meshing thrust forces in case of helical gear as the pinion gear or does not produce the meshing thrust force in case of spur gear as the pinion gear.

Besides the helical gears, the pinion gears and the side gears of the embodiments may be constituted by spur gears. In this case, the above correction of the angle of tooth trace may be executed so that when the pinion gear is slanted, each tooth trace will extend in the axial direction of the gear.

Furthermore, it should be noted that the differential apparatus of the present invention may be applicable to any one of a front differential apparatus for front wheels, a rear differential apparatus for rear wheels and a center differential apparatus for distributing the driving force into the front and rear wheels.

Finally, it is to be understood that the preferred embodiment disclosed therein is by way of example only and is not intended to impose limitations on the present invention, reference being had for this purpose to the claims which follow.

What is claimed is:

1. A differential apparatus comprising:

a first side gear rotatable about an axis;

a second side gear rotatable about the axis, in opposition to the first gear;

a casing member rotatable about the axis, the casing member covering the first and second side gears;

a first bore formed in the casing member, the first bore extending in parallel to the axis;

a first pinion having a first gear portion and a second gear portion and fitted in the first bore, the first pinion being frictionally slidably rotatable relative to the side wall of the first bore in a first position thereof parallel to the axis and in a second position thereof tilted from the first position, the first gear portion of the first pinion meshing with the first side gear, and the first pinion having a first pinion tooth formed in one of the first and second gear portions thereof;

a second bore formed in the casing member, the second bore extending in parallel to the axis; and a second pinion having a first gear portion and a second gear portion and frictionally slidably rotatable relative to the side wall of the second bore, the first gear portion of the second pinion meshing with the second side gear and the second gear portion of the second pinion meshing with the second gear portion of the first pinion, and at least one of the first side gear and the second gear portion of the second pinion having a mating tooth part formed therein to mesh with the first pinion tooth, wherein the first pinion tooth is capable of meshing with the mating tooth part over substantially the entire length of the first pinion tooth when the first pinion is in the second position.

2. A differential apparatus according to claim 1, wherein the first pinion tooth is tapered to have a head face gradually reduced in width, as it axially inwardly extends.

3. A differential apparatus according to claim 2, wherein the first pinion tooth is profiled at an arbitrary lengthwise location thereon on one side thereof with a first taper angle and at the other side thereof with a second taper angle different from the first taper angle.

4. A differential apparatus according to claim 3, wherein:

the first pinion has an axle portion between the first and second gear portions thereof;

the first gear portion of the first pinion has said first pinion tooth;

the second gear portion of the first pinion has another said first pinion tooth formed therein as a second pinion tooth;

the first taper angle of the first pinion tooth is equivalent to the second taper angle of the second pinion tooth; and the second taper angle of the first pinion tooth is equivalent to the first taper angle of the second pinion tooth.

5. A differential apparatus according to claim 4, wherein the head face of the first pinion tooth has a straight side substantially over length thereof.

6. A differential apparatus according to claim 4, wherein the head face of the first pinion tooth has a curvilinear lengthwise side.

7. A differential apparatus according to claim 1, wherein the first pinion tooth is laterally outwardly bulged between both ends thereof.

8. A differential apparatus according to claim 7, wherein the first pinion tooth comprises a helical tooth having a head face defined at an arbitrary lengthwise location thereon on one side thereof with a first radius of curvature and on the other side thereof with a second radius of curvature different from the first radius of curvature.

9. A differential apparatus according to claim 8, wherein:
   the first pinion has an axle portion between the first and second gear portions thereof:
   the first gear portion of the first pinion has said first pinion tooth;
   the second gear portion of the first pinion has another said first pinion tooth formed therein as a second pinion tooth;
   the first radius of curvature of the first pinion tooth is equivalent to the second radius of curvature of the second pinion tooth; and
   the second radius of curvature of the first pinion tooth is equivalent to the first radius of curvature of the second pinion tooth.

10. A differential apparatus according to claim 9, wherein the first pinion tooth is convexly curved at only one side thereof.

11. A differential apparatus according to claim 1, wherein the first pinion tooth has a tooth trace thereof matching a tooth trace of the mating tooth part, as the first pinion has the second position.

12. A differential apparatus according to claim 11, wherein the tooth trace of the first pinion tooth has an angle to the tooth trace of the mating tooth part in dependence on a combination of a distance between points for the first bore to support the first pinion and a radius gap between the first bore and the first pinion, as the first pinion has the first position.

13. A differential apparatus according to claim 1, wherein:
   the first and second side gears are connected to wheels of a vehicle;
   the casing member rotates in a first circumferential direction about the axis; and
   the first bore is formed at an angular position preceding the second bore in the first circumferential direction.

14. A differential apparatus according to claim 1, wherein the first pinion has a radially reduced axle portion between the first and second gear portions thereof.

15. A differential apparatus according to claim 1, wherein the first pinion tooth comprises a helical tooth.

* * * * *